United States Patent
Gutlhuber et al.

[15] 3,675,841
[45] July 11, 1972

[54] APPARATUS FOR AUTOMATIC EXECUTION OF MACHINING OPERATIONS, SUCH AS WELDING

[72] Inventors: Friedrich Gutlhuber, Huberweid-Strasse 57, 8375 Ruhmannsfelden; Lothar Kasper, Kircher-Strasse 48, 836 Deggendorf/Danube, both of Germany

[22] Filed: Sept. 30, 1969

[21] Appl. No.: 862,405

Related U.S. Application Data

[62] Division of Ser. No. 856,883, Sept. 29, 1969.

[52] U.S. Cl. ............................... 228/25, 29/471.1, 29/484, 219/125, 228/8
[51] Int. Cl. ........................................................ B23k 1/00
[58] Field of Search ...................... 228/8, 9, 10, 25; 219/121, 219/124, 125; 29/471.1, 484

[56] References Cited

UNITED STATES PATENTS

| | | | |
|---|---|---|---|
| 3,425,320 | 2/1969 | Hoglund | 90/13 |
| 3,392,262 | 7/1968 | Hansen et al. | 137/596 |
| 3,064,120 | 11/1962 | Ache | 219/125 |
| 3,035,157 | 5/1962 | Armstrong, Jr. et al. | 219/125 |
| 2,030,689 | 2/1936 | Dorrat | 219/125 |

*Primary Examiner*—John F. Campbell
*Assistant Examiner*—R. J. Craig
*Attorney*—McGlew and Toren

[57] ABSTRACT

A method for automatic execution of repetitive machining operations, such as welding, utilizes a tool mounted for movement, relative to a workpiece, along two mutually perpendicular coordinates. The individual partial movements of the tool along each of the respective coordinates are coordinated in a manner such that the total movement of the tool along the workpiece comprises plural individual closed path movements, such as curvilinear movements, periodically repeated at different points along the workpiece. The apparatus comprises a wheeled carriage movable along rails which may be mounted on the workpiece, and the carriage has a support base mounting a first table for longitudinal displacement therealong, and a second table is mounted on the first table for displacement transversely thereof. The second table mounts the tool. A plurality of rotatable cam discs are rotated by a control shaft and cam followers engaging these discs regulate the movements of the first and second tables. Positioning pins, engageable in apertures in the workpiece, are provided, and are also controlled by the cam discs. The positioning pins further may be engaged with a template mounted alongside the workpiece. The tool, in addition to its movement effected by the transversely movable table, may also be mounted in an eccentric so that the tool may execute a small radius circular movement in following the closed path, thereby widening a weld zone, for example.

12 Claims, 10 Drawing Figures

INVENTORS
FRIEDRICH GÜTLHUBER
LOTHAR KASPER

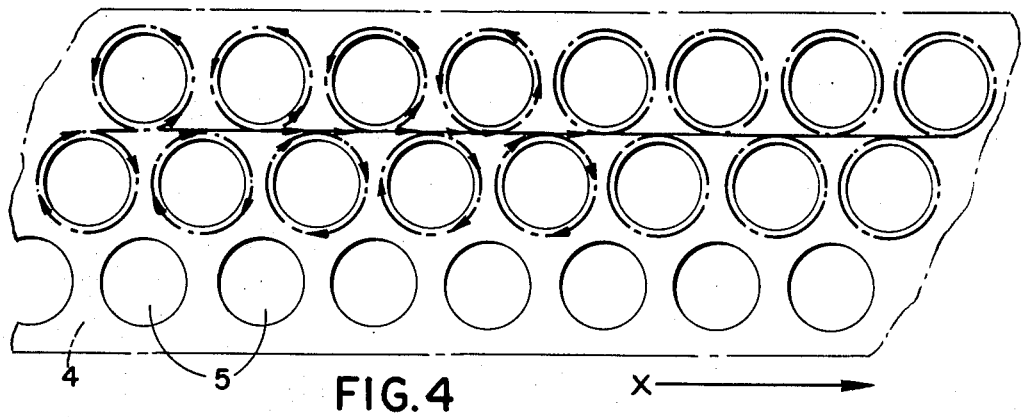
FIG.4
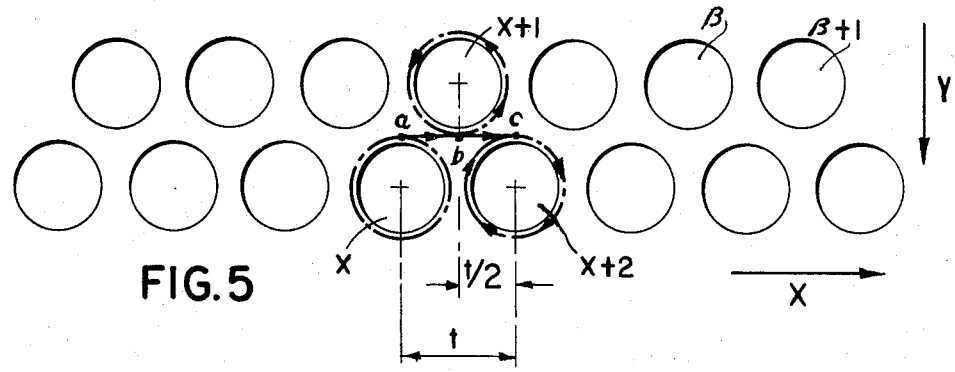
FIG.5
FIG.6
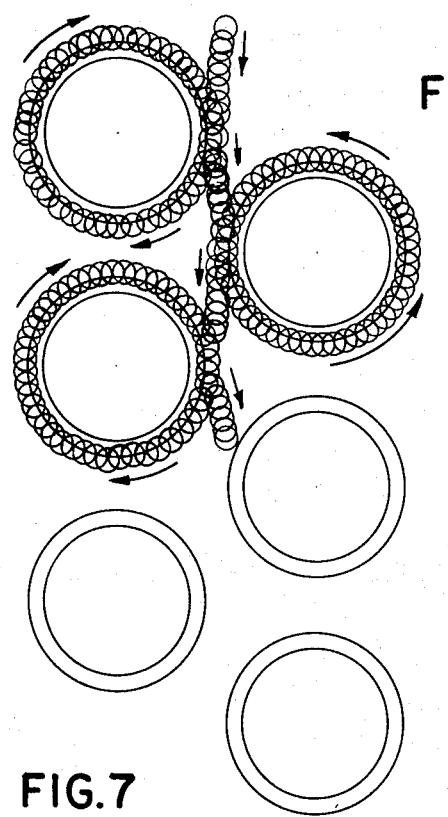
FIG.7
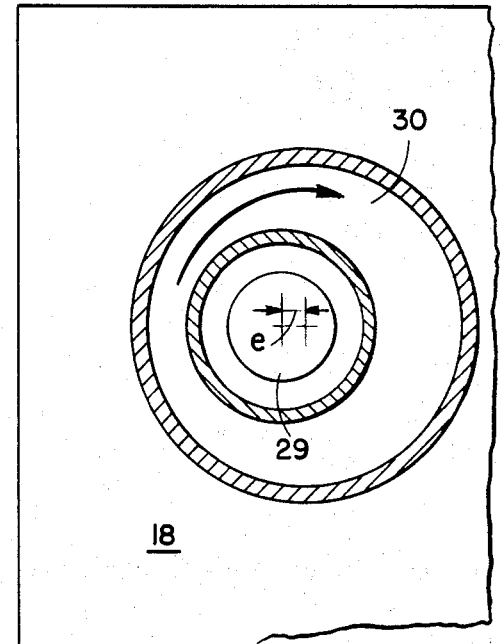
INVENTORS
FRIEDRICH GÜTLHUBER
LOTHAR KASPER
by McGlew & Toren
ATTORNEYS

INVENTORS
FRIEDRICH GÜTLHUBER
LOTHAR KASPER

3,675,841

APPARATUS FOR AUTOMATIC EXECUTION OF MACHINING OPERATIONS, SUCH AS WELDING

CROSS REFERENCE TO PRIOR APPLICATION

This is a division of application Ser. No. 856,883, filed on Aug. 29, 1969.

BACKGROUND OF THE INVENTION

It is known practice to carry out, automatically, locally limited machining operations, such as the welding of individual tubes into a header. In arrangements for doing this, the tool, such as a welding torch, for example, is moved manually into such a position relative to a machining point that, by means of corresponding control elements, an automatic movement of the tool in the form of predominantly circular movement returning to the starting point is effected. For the welding of adjacent tubes to the header, or for some other subsequent and similar machining operation, the apparatus must be manually repositioned.

Such a procedure, despite the automatic execution of the individual machining operations, is not very advantageous when a large number of similar operations must be carried out at different points along a workpiece. In such cases, the overall time required for adjustment of the apparatus to each subsequent working point is quite long in relation to the actual machining time, and this applies not only to the welding or rolling in of tubes in a header, but also to other machining operations, such as drilling, milling, hardening, soldering, cutting, etc. An additional factor is that, in welding and other similar operations, operational faults, such as pore formation or the like, often occur at the beginning of each separate machining operation.

SUMMARY OF THE INVENTION

This invention relates to automatic execution of machining operations and, more particularly, to a novel and improved apparatus for automatic execution of repetitive machining operations at different points along a workpiece.

The objective of the invention is to obviate the disadvantages of the prior art by providing a still more advanced automation of periodically repeated machining operations. For this purpose, in the invention and with the aid of control elements, partial movements of the tool, occurring relative to the workpiece, are so influenced, in two mutually perpendicular coordinate directions, that there results automatically a total movement of the tool, composed of several individual operations or movements, along a closed path, such as a curvilinear path, these movements being repeated at different points along the workpiece. The workpiece per se also may move, and the relative movements of the tool are adapted to any movement of the workpiece.

Preferably, the points of the workpiece which can be machined in one continuous machining operation are arranged in rows, for example, in two rows, the tool executing a total movement composed of ring-shaped sections in the zone of each point and connecting sections between successive points.

In accordance with a further feature of the invention, the machining operation can be interrupted temporarily during the total movement of the tool, and can be carried out simultaneously at $n$ points with $n$ tools, so that the output can be multiplied accordingly. However, even with respect to machining operations performed with a single tool, such as a welding rod, for example, major advantages are obtained by saving the time normally required for repositioning the apparatus on the workpiece and for re-igniting the arc at each successive welding point, as well as by the elimination of the faults which experience has shown to occur at the beginning of such machining operations.

With respect to the apparatus aspects of the invention, a wheeled carriage is arranged to be moved along the work, under the control of positioning pins or the like engageable, for example, in apertures of the workpiece, such as a tube header. This carriage mounts a first longitudinally displaceable table on which latter is mounted a transversely displaceable table carrying the tool. A plurality of cam discs are rotated by a control shaft, and cam followers engaged with these discs control the displacements of the two tables and of the locating pins.

As a feature of the apparatus, the mounting of the tool on the transversely displaceable table may include an eccentric arrangement whereby the tool, such as a welding torch, during its translatory movement is also revolved about a very small radius, for example to widen a weld deposit.

An object of the invention is to provide an improved apparatus for automatic execution of repetitive machining operations.

Another object of the invention is to provide such an apparatus which is free of shortcomings of the prior art.

A further object of the invention is to provide such an apparatus by which increased automation of repetitive machining operations may be attained.

A further object of the invention is to provide such an apparatus in which, with the aid of control elements, partial movements of a tool relative to a workpiece are so influenced, along two mutually perpendicular coordinates, that the total automatic movement of the tool is composed of several individual closed path movements, such as curvilinear movements, periodically repeated at different points along the workpiece.

A further object of the invention is to provide such an apparatus in which the workpiece itself may be moved, with the movement of the tool being adapted to the movements of thw workpiece.

For an understanding of the principles of the invention, reference is made to the following description of typical embodiments thereof as illustrated in the accompanying drawings.

BRIEF DESCRIPTION OF THE DRAWINGS

In the drawings:

FIG. 4 is a plan view of a tube header illustrating the progress of a continuous machining operation;

FIG. 5 is an explanatory view, corresponding essentially to FIG. 4; and illustrating the progress of a single period of tool movement, with the correlated state of a control system;

FIG. 6 is a view illustrating an eccentric control element for the tool;

FIG. 7 is a plan view illustrating the effect of the additional control element, shown in FIG. 6, on the machining operation;

DESCRIPTION OF THE PREFERRED EMBODIMENTS

Figure 1:
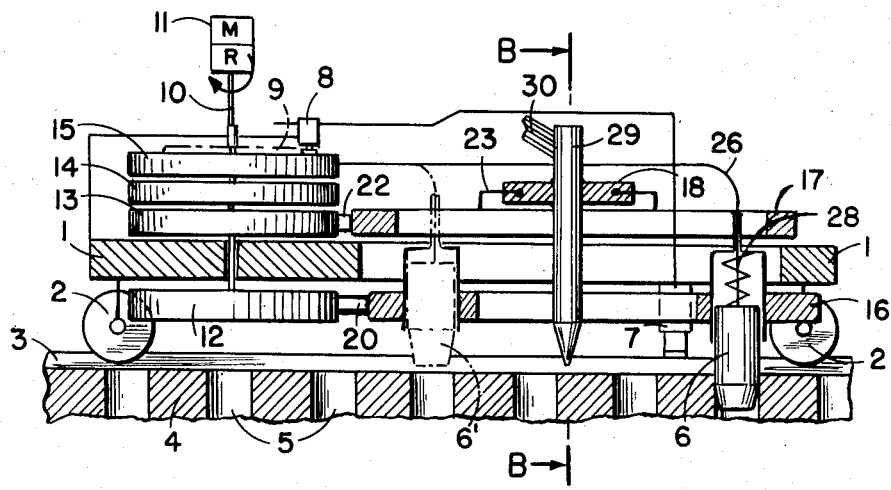
FIG. 1 is a longitudinal sectional view, on the line A—A of FIG. 3, illustrating apparatus, embodying the invention, for welding tubes into a tube header.
Figure 2:
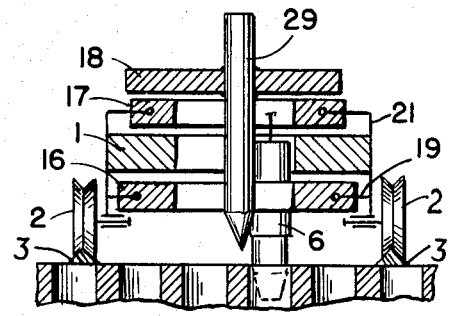
FIG. 2 is a transverse sectional view of the apparatus on the line B—B of FIG. 1.
Figure 3:
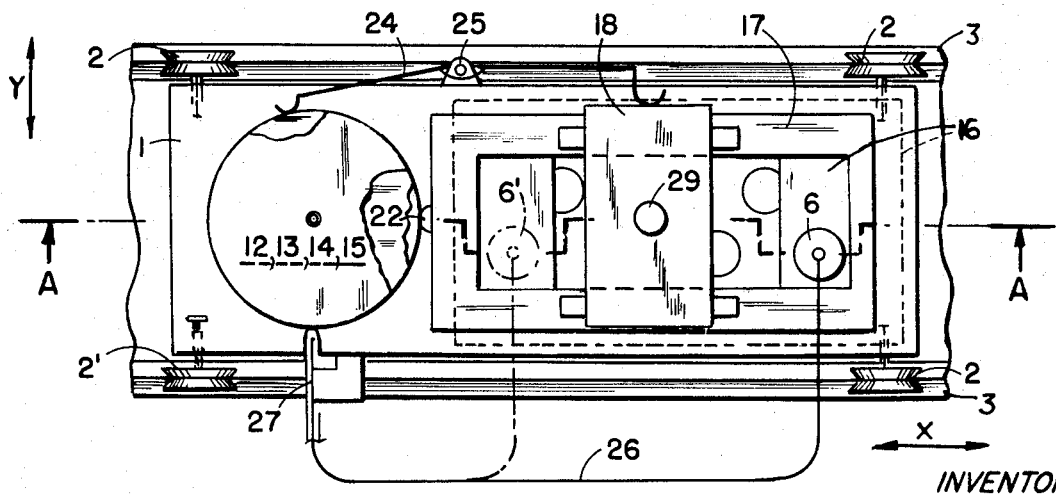
FIG. 3 is a plan view of the apparatus.

Referring first to the embodiment of the invention shown in FIGS. 1, 2 and 3, a base table or support 1, serving as a support for all other correlated parts, is supported on four wheels 2 running along tracks 3 which are temporarily fixed on the workpiece to be machined, for example, a tube header 4, the tracks 3 extending in one coordinate direction X of the machining operation. As can be seen from FIGS. 4 and 5, the rows of apertures 5 in the tube header 4, into which tubes are to be welded, also extend in the X coordinate direction. A bolt or pin 6 is provided for exact aligning and fixing of the apparatus relative to the workpiece, and a bolt 6' is mounted for vertical displacement in the front part of the apparatus for positioning engagement in a bore of tube header. Such engagement, in each instance, is effected in connection with an arrangement of wheels 2 such that the entire machine is adjustable in the X direction and also, in the zone of bolt 6, a small amount in the Y direction. At the other or rear end of the machine, the wheel designated 2' is mounted so that it cannot be displaced in the Y coordinate direction relative to base table or support 1.

A vertical control shaft 10 is rotatably mounted in support 1 and driven by an electric motor 11 at a constant angular velocity. Several cam discs 12–15 are arranged on shaft 10, partly above and partly below base table 1. These cam discs serve as controls for the operation of the apparatus. Thus, bottom cam disc 12 controls a bolt table 16, the next higher cam disc 13 controls a longitudinal displaceable table 17, the next succeeding cam disc 14 controls a transversely displaceable table 18, and the top cam disc 15 controls the bolts 6 and 6'.

Bolt table 16, in which are mounted bolts 6 and 6', is displaceable, along lateral guides 19, in the X coordinate direction and relative to support 1. Bolt table 16, moreover, is connected with base table or support 1 by springs (not shown) in such a manner that a scanning pin or cam follower 20 fixed on table 16 continually engages cam disc 12. Table 17 is also displaceable, longitudinally relative to support 1, along lateral guides 21 in the X direction, and is so connected to support 1 by springs (not shown) that a scanning pin or cam follower 22 secured thereon constantly engages cam disc 13.

Transverse table 18 is displaceable along guides 23 relative to longitudinal table 17 in the Y coordinate direction, and moreover is connected with table 17 by springs (not shown) in a manner such that an angle lever 24, pivotal about a bearing 25 on support 1, constantly engages cam disc 14.

The actuation of bolt 6, by means of which bolt table 16 is centered and fixed relative to tube header 4 at periodic intervals, is effected by a flexible cable 26 connected to a scanning pin or cam follower 27 constantly engaging cam disc 15 under the bias of a spring 28. When the machine is in a zone of tube header 4 in which bolt 6 is no longer positioned over a bore or aperture 5 in the header, the function of bolt 6 is taken over by bolt 6' which is then brought into positive contact with cam disc 15, in an analogous manner, and through flexible cable 26 and scanning pin or cam follower 27.

In the embodiment of the invention shown in FIGS. 1, 2 and 3, the machining tool is a weld rod 29 supplied with welding current through the usual contact jaws such as illustrated at 30. Weld rod 29 is operable to effect welding in of tubes, for example in two adjacent rows of bores or apertures 5 of header 4, and the welding in operation is carried out completely automatically in accordance with the curvilinear motion shown in FIG. 4, with reference to the arrows therein. Specifically, this is effected, starting from the state indicated in FIG. 5, in that bolt 6 engages in aperture $\beta$ of header 4, weld rod 29 is located at point $a$, and tube $x$ is already welded in, as will be explained.

Weld rod 29 now travels, at constant velocity, the distance $a$–$b$, this is effected by rotation of control shaft 10 at a uniform angular velocity with corresponding rotation of cam discs 12–15, arranged thereon, at a uniform angular velocity. Thus, by a corresponding reentrant circumferential portion of bottom cam 15 coming in contact with scanning pin 20, a relative movement is effected between bolt table 16, fixed by bolt 6 relative to tube plate 4, and base table or support 1.

When support 1, with all of the components carried thereby, has been moved to the extent that weld rod 29 is located at point $b$, support 1 is retained, relative to tube header 4, by a magnetic brake 7 which is then automatically energized by means of a cam 9 on top cam disc 15 actuating a switch 8. Then, by a corresponding movement of cam discs 13 and 14, longitudinal table 17 and transverse table 18, respectively, are moved relative to base table or support 1 in such a manner that weld rod 29 executes a circular movement about tube $x + 1$ in the direction of the arrow.

During retention of base table 1 against movement relative to tube header 4 by magnetic brake 7, bolt 6 is withdrawn from bore $\beta$ of tube header 4 by joint action of spring 28, flexible cable 26 and scanning pin 27 engaging a reentrant circumferential portion of cam disc 15. Subsequently, bolt table 16 is displaced in the X coordinate direction through the distance $t$, representing the center-to-center spacing of the header apertures 5, this being effected by cam disc 12, with the displacement of bolt table 16 being relative to the now stationary base table or support 1. Thereupon, bolt 6 again takes over the fixation of the machine by centering in the next bore $\beta + 1$, while magnetic brake 7 is released.

In this state, and after termination of the circular movement of weld rod 29 about tube $x + 1$, support 1 is advanced through the distance $b$–$c$, again corresponding to the distance $t/2$, or one-half the center-to-center spacing of the header apertures in a row, and relative to header 4. As soon as weld rod 29 has arrived at the point $c$, there again occurs, by joint action of cam discs 13 and 14 on the respective longitudinal and transverse tables 17 and 18, a circular movement of weld rod 29, but now in the opposite circumferential direction about tube $x + 2$. When both tubes $x + 1$ and $x + 2$ are completely welded into tube header 4, and weld rod 29 is present at point $c$ for the second time, one period of the continuous welding operation is completed, during which control shaft 10 has executed one complete revolution.

The described procedure is repeated periodically until all the tubes have been welded into the apertures in the two rows of apertures of tube header 4. When bolt 6 has reached the outermost tube aperture, the centering is reset, for the rest of the welding operation, to the second bolt 6' which is arranged, considered from the direction of feed or movement, behind weld rod 29. Bolts 6 and 6' alternatively may be actuated in a different manner, for example, by pneumatic or hydraulic setting members and switches. For the welding of tubes into the tube apertures of the next two rows, the machine is repositioned by a corresponding displacement of tracks 3 laterally of the workpiece.

As illustrated in FIG. 6, weld rod 29 may be mounted in transverse table 18 through the medium of an eccentric 30 and, upon rotation of eccentric 30, the longitudinal axis of weld rod 29 executes a circular movement with a radius corresponding to the eccentricity $e$. When this eccentric movement of weld rod 29 is imposed on the periodic curvilinear motion shown in FIGS. 4 and 5, there results the movement illustrated in FIG. 7. Such an additional "stirring" movement of weld rod 29 has the result of widening the weld bead and also the result of better distribution of the welding heat in consideration of the different thicknesses of the tube header and the tube wall.

Figure 11:
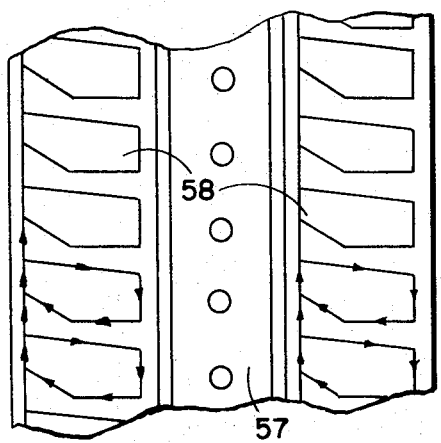
FIG. 11 is a plan view illustration another machining operation which can be performed with the apparatus shown in FIGS. 1, 2 and 3.

At variance with the described operation with reference to FIGS. 1 through 5, wherein the machine is centered in or at the workpiece to be machined, the machine of FIGS. 1, 2 and 3 alternatively may be centered outside the workpiece, for example, in or at a template 57 as shown in FIG. 11. The arrangement of FIG. 11 is suitable especially for the torch cutting of the series of identical, relatively small pieces 58 from a large plate.

Figure 8:
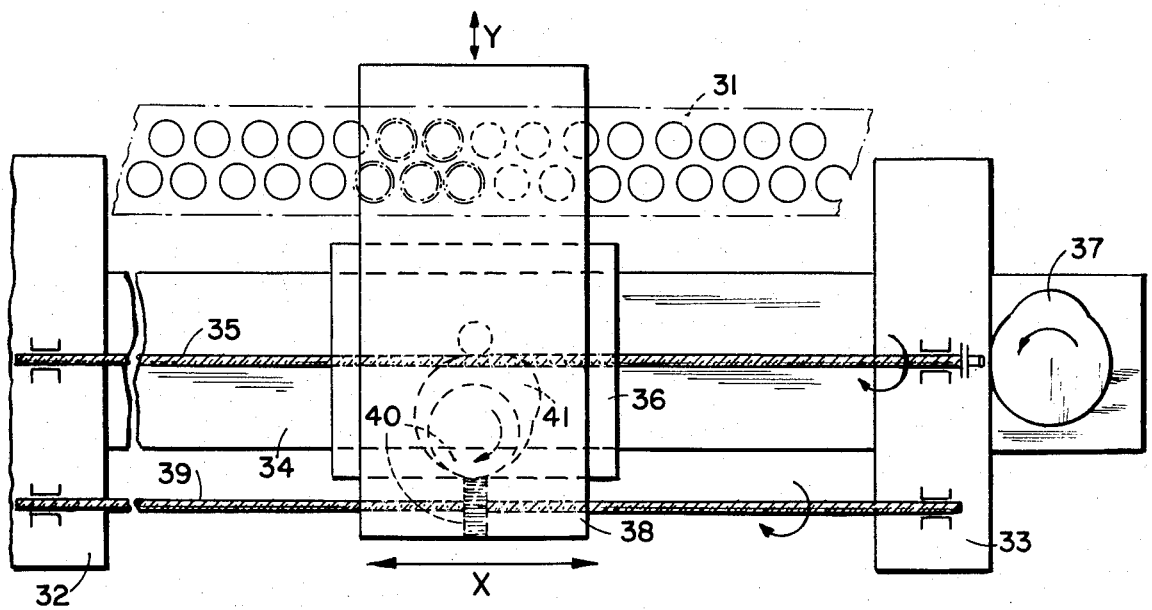
FIG. 8 is a plan view of another embodiment of apparatus in accordance with the invention.

FIG. 8 illustrates another embodiment of the apparatus which, in contrast to the embodiment described, is fixedly positioned while workpiece 31 is brought into the position required for machining. The apparatus illustrated in FIG. 8 consists essentially of two standards 32 and 33 between which there extends a guide track 34 for a longitudinal table 36 which is movable in the X coordinate direction by means of a threaded spindle 35. Upon this uniform forward movement of table 36 in the X coordinate direction, there is imposed a periodical forward and backward movement produced by a cam disc 37 acting at the end face of threaded spindle 35 which is mounted for longitudinal or axial displacement thereof.

On longitudinal table 36, there is again arranged a transverse table 38 carrying the weld rod (not shown in FIG. 8), and table 38 is moved by means of a draw spindle 39, gears 40 and a cam disc 41 in the Y coordinate direction. Due to the mutual superposition of the movements of longitudinal table 36 and transverse table 38, the weld rod executes also, in the embodiment of FIG. 8, a compound periodical curvilinear movement in the zone of two adjacent rows of bores of tube header 31, in the same manner as explained with reference to FIG. 5.

Alternatively, longitudinal table 36 may be controlled numerically, with threaded spindle 35 being omitted. The movement of longitudinal table 36, in this case, must also cooperate with the movement of transverse table 38 in the sense of the intended periodical curvilinear movement of the weld rod.

Figure 9:
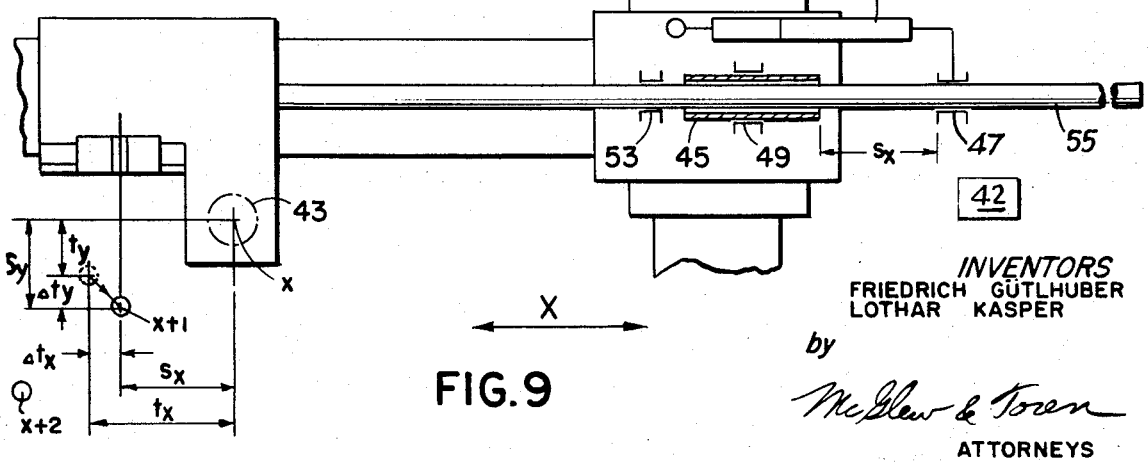
FIG. 9 is a somewhat schematic plan view of yet another embodiment of apparatus in accordance with the invention.

While the two embodiments of FIGS. 1, 2 and 3 and of FIG. 8, respectively, presuppose a uniform spacing of the successive machining points of the workpiece, for example, a uniform center-to-center spacing of the tube receiving apertures of a tube header 4, in the embodiment of the invention shown in FIG. 9, it is possible to weld in tubes automatically in addition at irregular spacings.

Referring to FIG. 9, by means of the schematically indicated control device 42, output pulses are supplied, by successive switching operations, to different setting members, which latter thereupon execute the necessary movements. First, the weld rod 43 is adjusted for a tube $x$ and executes, about this tube, a circular movement, possibly in connection with an additional stirring movement effected by an eccentric in the manner already explained above with reference to FIGS. 6 and 7. While the first tube $x$ is being welded in, the coordinates $s_x$ and $s_y$ of the following tube $x + 1$ are, by means of a centering bolt 44, which was first adjusted for the coordinates $t_x$ and $t_y$ of the middle tube division, measured and stored mechanically. This is effected with the assistance of analog or mechanical elements, for example in that two bushings 45 and 46, movable in the coordinate directions X and Y, respectively, are displaced until the respective distances between one bushing end and respective brakes 47 and 48 are attained. Then these bushings are locked by other brakes 49 and 50, respectively, while brakes 47 and 48 are closed, at that time, and are present in an end position with respective hydraulic cylinders 51 and 52 serving for their control.

When the welding operation at the first tube is completed, brakes 53 and 54, which are arranged adjacent the opposite ends of bushings 45 and 46 on the respective push rods 55 and 56 are released. Thereupon push rods 55 and 56 are displaced, by means of the respective cylinders 51 and 52 acting through the respective closed brakes 47 and 48 until brakes 47 and 48 abut against the respective bushings 45 and 46. At this time, tube $x + 1$ is welded, while centering bolt 44 is adjusted for the next following tube $x + 2$. Small indexing errors $\Delta t_x$ and $\Delta t_y$ can be compensated by centering bolt 44 automatically by means of its conical taper 44' at its lower end while, in the case of larger indexing errors, manual compensation must be effected.

The distances $s_x$ and $s_y$, between centering bolt 44 and the relative system, can be copied, between brakes 47 and 48 and the respective bushings 45 and 46, also by means of a cable line. Instead, there may be used, for the same purpose, a measuring transducer whose voltage U, for example, is proportional to the respective distance S. By means of an amplifier, a high output power is produced, which is sufficient to copy the distance between each bushing and its associated brake. A setting member provides for the proportionality of distance S and voltage U. In a like manner, a regulator may be used for adjusting the distance S, which represents the displacement of the bushing.

Such a device operates in that, first, distance S between the relative system and the centering bolt is picked up by the measuring transducer and is fed as a theoretical value to a regulator. As the actual value, the distance S between one end of each bushing 45 or 46 and the associated brake 47 or 48 is also fed into the regulator. The regulator now compares a theoretical value with the actual value, establishes any existing deviation, and accordingly shifts, with a setting member, one or the other bushing until the actual value has reached the magnitude of the theoretical value.

Figure 10:
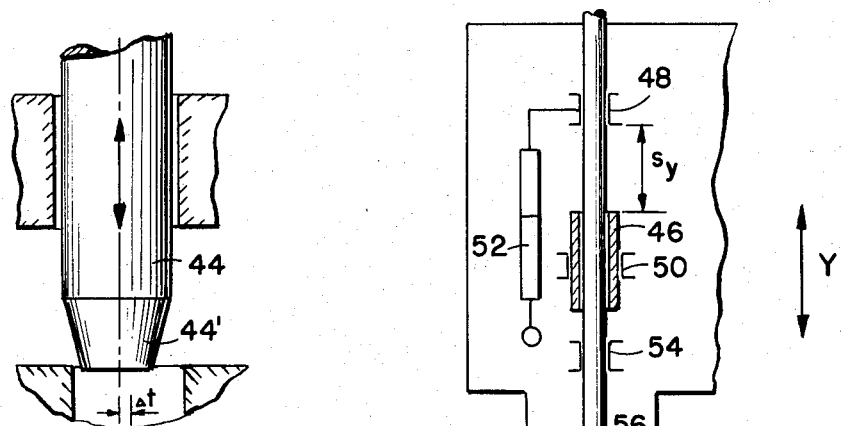
FIG. 10 is a somewhat schematic elevation view illustrating a detail of the apparatus shown in FIG. 9.

All three of the above-described embodiments, shown, respectively, in FIGS. 1, 2 and 3, in FIG. 8, and in FIGS. 9 and 10, comprise an advancing system and a periodical superposition system. The latter may, as in the first two embodiments shown, respectively, in FIGS. 1, 2 and 3, and in FIG. 8, consist of a longitudinal table and a transverse table or, as in the embodiments shown in FIGS. 9 and 10, of an eccentric. Instead of the mentioned arrangements, other elements, known from transmission engineering are usable.

If the periodical movements are effected by means of cam discs, the circumfererences of the latter are so designed that the correlated transmission elements are actuated according to the curve form S rel. $=f(\phi)$. The control of the movements by cam discs, in connection with scanning elements or cam followers, is mechanical. Alternatively, the control may be effected from outside the machine support, by electrical or hydraulic pulses being supplied to the setting members. For small series of workpieces, for example for the torch cutting of sheets, the expenditure for new cam discs is relatively great. To avoid this, the following procedure may be adopted, for example, with the embodiment of the invention shown in FIG. 8.

Figure 12:
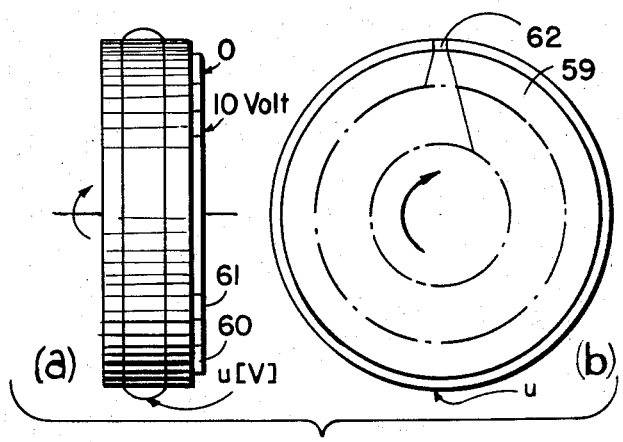
FIGS. 12a and 12b are side and front elevation views of a control element used with the apparatus of the invention.
Figure 13:
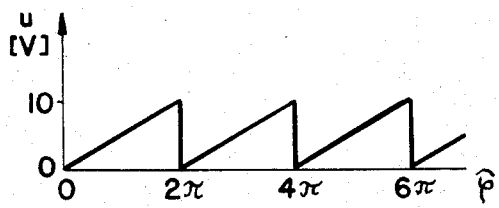
FIG. 13 is a graphic illustration of the voltage curve obtained using the control element of FIGS. 12a and 12b.

On the longitudinal table 36, which at $n$ revolutions is moved onward by threaded spindle 35 by one division, in a like manner as on the transverse table, a periodical movement is superimposed. A certain reduction of speed relative to the threaded spindle brings about that a control wheel executes precisely one revolution during one period. By means of such a control wheel 59, which is shown in FIGS. 12a and 12b, voltages of, for example, 0 and 10 volts are fed into the machine through two slip rings 60 and 61. On the circumference of control wheel 59 there is arranged a resistance 62 whose opposite ends are electrically connected to the respective slip rings associated with 0 and 10 volts. The voltage present at the circumference, or, respectively, the resistance of control wheel 59, is picked up by a scanner. By the movement of the control wheel, there is then formed a so-called sawtooth voltage, as shown in FIG. 13, and this voltage is then fed into an analog computer.

The periodical voltage also can be produced, for example, by an integration member in the analog computer itself, in that, after each division, a pulse reduces the output voltage formed. The analog computer now represents the desired values (S$x$ and S$y$), corresponding to the existing voltage values, as voltages. Analog computers operate with only a finite precision. However, they can be used to actuate the periodical superposition, as the distances to be travelled are small. There is no addition of errors, because the advancing system establishes the absolute position of the relative system.

The copying of magnitudes can be effected not only by means of electronic computers (by voltages), but also by hydraulic or pneumatic analog computers.

Figure 14:
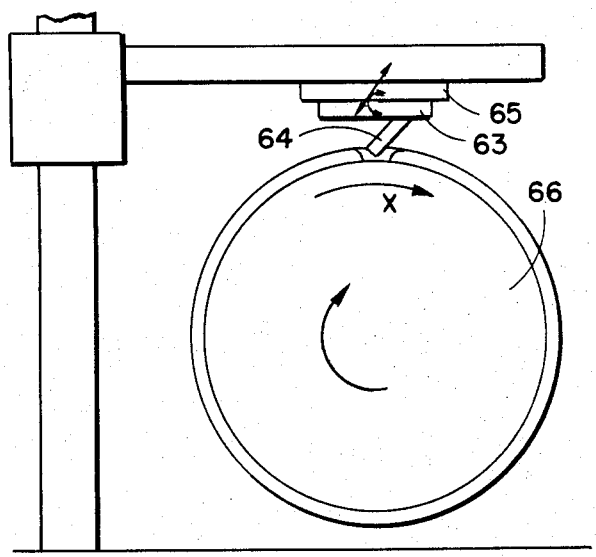
FIG. 14 is an elevation view illustrating an embodiment of the invention in which both the tool and the workpiece are moved.

The analog computer calculates the curves $s = f$(period) repeatedly, according to the functions. Alternatively, the functions can be calculated in advance and stored, for example, in mechanical, analog, or digital function generators. The function generator then gives out recurrently, as it operates, the desired output values $s = f$ (period), according to the input pulses. While, in the machines so far described, the assumption is that, during the machining operation, the workpiece is fixed and the tool moves, the workpiece may move relative to the tool in addition to the tool movement. The determining factor is always only a relative movement between the workpiece and tool corresponding to the machining progress. FIG. 14 shows a modified embodiment of the invention wherein tool 64, again mounted in an eccentric 63, is movable only by means of a transverse table 65 movable in the Y direction, while workpiece 66 is rotated in the direction of arrow $x$, whereby the advancing movement in the X coordinate direction, otherwise executed by the longitudinal table, is replaced.

Figure 15:
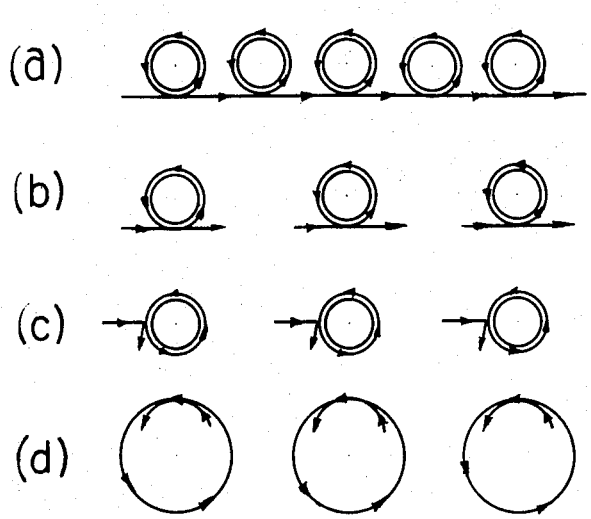
FIGS. 15a through 15d are somewhat diagrammatic illustrations of both continuous and intermittent machining operations performed by the method and apparatus of the invention.

The closed path formations shown in FIGS. 15a–15d enter into consideration for different machining operations. Thus, the closed paths formations of FIG. 15a are used for welding-in tubes, those shown in FIGS. 15b and 15c are used for welding-in stay bolts, and those shown in FIG. 15d are used for welding-in projections. In the machining process as shown in FIGS. 15b, 15c, and 15d, the tool is not in engagement with the workpiece between successive machining points. Furthermore, a different speed of the tool, during a periodical curve form, is possible.

While specific embodiments of the invention have been shown and described in detail to illustrate the application of the principles of the invention, it will be understood that the invention may be embodied otherwise.

What is claimed is:

1. Apparatus for automatic execution of repetitive machining operations, such as welding, by controlling individual partial movements of a tool, relative to a workpiece, along each of a pair of mutually perpendicular coordinates in a coordinated manner such that the total movement of the tool along the workpiece comprises plural individual closed path movements periodically repeated at different points along the workpiece, said apparatus comprising, in combination, carriage means automatically movable relative to the workpiece and automatically displaceable between different points on the workpiece at which individual closed path movements are formed; guide members extending longitudinally of one of said coordinates and guiding said carriage means for movement along said one coordinate; said carriage means including two first elements at least one of which is positively connected with the workpiece; two second elements, each movable along a respective one of the coordinate, on said carriage means; and a tool mounted on one of said second elements; said second elements imparting superimposed movements to said tool in accordance with the desired closed path movements.

2. Apparatus for automatic execution of repetitive machining operations, as claimed in claim 1, in which one of said second elements is operable to effect movement of said tool longitudinally of said guide members and the other of said second elements is operable to effect movement of said tool transversely of said guide members; and adjustable components connected with said second elements and serving, during machining at a point of the workpiece, for pre-adjustment of the coordinates for the next machining point of the workpiece; said adjustable components comprising respective bushings each connected to one of said second elements, respective rods, each extending through one of said bushings, with one of said rods being connected to said tool for movement of the latter, first brake means operatively associated with said rods and mounted for adjustment longitudinally of the associated rods, second brake means operatively associated with said bushings and third brake means each fixed to a respective second element and operable on the associated rod.

3. Apparatus for automatic execution of repetitive machining operations, as claimed in claim 1, including analog means operatively associated with said elements and controlling the partial movements of said tool.

4. Apparatus for automatic execution of repetitive machining operations, as claimed in claim 1, including numerical means operatively associated with said elements and controlling the partial movements of said tool.

5. Apparatus for automatic execution of repetitive machining operations, as claimed in claim 1, including analog means operatively associated with said elements and serving, during a machining operation at one point of the workpiece, to pre-adjust the apparatus in accordance with the coordinates for the succeeding machining point.

6. Apparatus for automatic execution of repetitive machining operations, as claimed in claim 1, including numerical means operatively associated with said elements and serving, during machining at one point of the workpiece, for pre-adjustment of the coordinates for the next machining point on the workpiece.

7. Apparatus for automatic execution of repetitive machining operations, as claimed in claim 1, including a template serving as a control member for movement of said carriage means and for relative movements of said tool; said template being engageable by said at least one element.

8. Apparatus for automatic execution of repetitive machining operations, such as welding, by controlling individual partial movements of a tool, relative to a workpiece, along each of a pair of mutually perpendicular coordinates in a coordinated manner such that the total movement of the tool along the workpiece comprises plural individual closed path movements periodically repeated at different points along the workpiece, said apparatus comprising, in combination, carriage means movable relative to the workpiece; guide members extending longitudinally of one of said coordinates and guiding said carriage means for movement along said one coordinate; said carriage means including two first elements at least one of which is positively connected with the workpiece; two second elements, each movable along a respective coordinate, on said carriage means; a tool mounted on one of said second elements; said second elements imparting superimposed movements to said tool in accordance with the desired closed path movements; means for fixing said carriage means relative to the workpiece includes a centering bolt spaced a relative short distance from the particular machining area, and a guide element, engageable with said guide members and permitting movement of said carriage means along only said one coordinate, said guide elements being positioned remote from said centering bolt.

9. Apparatus for automatic execution of repetitive machining operations, as claimed in claim 8, in which said first elements include a base table movable along said one coordinate and a bolt table mounted on said base plate for movement along said one coordinate; said second elements including a longitudinal table mounted on said base table for movement along said one coordinate and a transverse table mounted on said longitudinal table for movement along the other coordinate; a control shaft rotatably mounted on said base table; a plurality of control disc cams mounted on said control shaft and having cam peripheries coordinated with the desired movements of said bolt table, said longitudinal table, said transverse table and said centering bolt; and respective cam followers operatively connected to said bolt table, said longitudinal table, said transverse table and said centering bolt and each engaged with a respective one of said control disc cams.

10. Apparatus for automatic execution of repetitive machining operations, as claimed in claim 9, including springs each interacting between two tables of a pair to maintain said cam followers engaged with said control disc cams.

11. Apparatus for automatic execution of repetitive machining operations, as claimed in claim 9, including an eccentric rotatably mounted in said transverse table and supporting said tool, the rotation of said eccentric imparting an additional stirring movement to the tool and imposed on the tool movement effected by the control disc cams.

12. Apparatus for automatic execution of repetitive machining operations, such as welding, by controlling individual partial movements of a tool, relative to a workpiece, along each of a pair of mutually perpendicular coordinates in a coordinated manner such that the total movement of the tool along the workpiece comprises plural individual closed path movements periodically repeated at different points along the workpiece, said apparatus comprising, in combination, carriage means movable relative to the workpiece; guide members extending longitudinally of one of said coordinates and guiding said carriage means for movement along said one coordinate; said carriage means including two first elements at least one of which is positively connected with the workpiece; two second elements, each movable along a respective coordinate, on said carriage means; a tool mounted on one of said second elements; said second elements imparting superimposed movements to said tool in accordance with the desired closed path movements; said two second elements comprise a longitudinal table movably mounted on one of said first elements for movement along said one coordinate and a transverse table movably mounted on said longitudinal table for movement along the other coordinate; a pair of fixed standards aligned along said one coordinate; first and second spindles rotatably mounted in said fixed standards and extending parallel to said one coordinate; said first spindle constituting a longitudinally displaceable threaded spindle driving said longitudinal table which is movable between said standards; said second spindle constituting a draw spindle driving said transverse table in a direction parallel to said other coordinate, and respective cam discs each operatively associated with a respective spindle and the associated table and serving as respective additional control members for superimposing periodical reciprocation on the associated tables.

* * * * *